(12) United States Patent
Ito et al.

(10) Patent No.: US 10,618,375 B2
(45) Date of Patent: Apr. 14, 2020

(54) VEHICULAR AIR-CONDITIONER

(71) Applicant: DENSO CORPORATION, Kariya, Aichi-pref. (JP)

(72) Inventors: Dai Ito, Kariya (JP); Akira Oga, Kariya (JP); Hiroshi Takeda, Kariya (JP); Atsushi Furukawa, Kariya (JP); Masataka Kinoshita, Kariya (JP); Tatsumi Kumada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 114 days.

(21) Appl. No.: 16/063,709

(22) PCT Filed: Oct. 28, 2016

(86) PCT No.: PCT/JP2016/082008
§ 371 (c)(1),
(2) Date: Jun. 19, 2018

(87) PCT Pub. No.: WO2017/110244
PCT Pub. Date: Jun. 29, 2017

(65) Prior Publication Data
US 2019/0009639 A1    Jan. 10, 2019

(30) Foreign Application Priority Data

Dec. 22, 2015  (JP) ................................ 2015-249525

(51) Int. Cl.
*B60H 1/00* (2006.01)
*B60H 1/32* (2006.01)
(Continued)

(52) U.S. Cl.
CPC ..... *B60H 1/00742* (2013.01); *B60H 1/00792* (2013.01); *B60H 1/00807* (2013.01); *B60H 1/00828* (2013.01); *B60H 1/00871* (2013.01)

(58) Field of Classification Search
CPC .. B60H 1/00; B60H 1/32; B60H 1/34; B60W 40/08; A47C 7/74; F24F 7/00
See application file for complete search history.

(56) References Cited

U.S. PATENT DOCUMENTS 6,170,274 B1 * 1/2001 Ichishi ................... B60H 1/345
                                                              62/179
6,719,624 B2 * 4/2004 Hayashi ............. B60H 1/00285
                                                              454/120
(Continued)

FOREIGN PATENT DOCUMENTS

JP    2004155408 A  *  6/2004  ............... B60H 1/34
JP    2005059821 A  *  3/2005  ............... B60H 1/00
(Continued)

*Primary Examiner* — Yuri Kan
(74) *Attorney, Agent, or Firm* — Harness, Dickey & Pierce, P.L.C.

(57) ABSTRACT

A vehicular air-conditioner includes: a wind changing unit that changes at least one of a wind volume and a wind direction of air-conditioned wind, a temperature detection unit that detects a surface temperature of an object based on radiation from the object, a detection position changing unit that changes a position of a detection target region that is a region in which the surface temperature is to be detected by the temperature detection unit, and a control unit that controls each operation of the wind changing unit and the detection position changing unit. The control unit controls at least one of the operation of the wind changing unit and the operation of the detection position changing unit to suppress changes in the wind volume of the air-conditioned wind in the detection target region when a portion of the surface of an occupant is in the detection target region.

7 Claims, 6 Drawing Sheets

(51) Int. Cl.
*B60H 1/34* (2006.01)
*F24F 7/00* (2006.01)
*A47C 7/74* (2006.01)

(56) References Cited

U.S. PATENT DOCUMENTS

2004/0103675 A1* 6/2004 Tomita ............... B60H 1/00735
  62/157
2015/0105976 A1* 4/2015 Shikii .................. G06F 3/0488
  701/36

FOREIGN PATENT DOCUMENTS

JP          4062124 B2 *  3/2008  ............... B60H 1/00
WO    WO-2016166938 A1   10/2016

* cited by examiner

VEHICULAR AIR-CONDITIONER

CROSS REFERENCE TO RELATED APPLICATIONS

This application is a U.S. National Phase Application under 35 U.S.C. 371 of International Application No. PCT/JP2016/082008 filed on Oct. 28, 2016 and published in Japanese as WO 2017/110244 A1 on Jun. 29, 2017. This application is based on and claims the benefits of priority from Japanese Patent Application No. 2015-249525 filed on Dec. 22, 2015. The entire disclosures of all of the above applications are incorporated herein by reference.

TECHNICAL FIELD

The present disclosure relates to a vehicular air-conditioner to be provided in a vehicle.

BACKGROUND ART

A vehicular air-conditioner that measures a surface temperature of an occupant with an infrared sensor and performs air conditioning control based on the surface temperature is known. For example, Patent Literature 1 discloses a vehicular air-conditioner in which an infrared sensor is disposed on a swing louver provided in a vent hole to calculate a surface temperature of an occupant.

In such a configuration, a direction of the infrared sensor changes within a certain range in accordance with swing of the swing louver. For this reason, temperature can be measured in a wider range including the occupant by using a less-expensive infrared sensor having a narrower detection range.

PRIOR ART LITERATURES

Patent Literature

Patent Literature 1: JP 4062124 B1

SUMMARY OF INVENTION

The vehicular air-conditioner disclosed in Patent Literature 1 does not measure all of the surface temperature of the occupant at one time, but detects entire temperature distribution by gradually moving its measuring range while measuring a local range. That is, the measurement timing of the surface temperature varies depending on the measured location.

Therefore, when the entire surface temperature temporarily changes, the surface temperature can be detected as if the surface temperature of one part is different from those of the other parts. For example, when a wind volume of an air-conditioned wind hitting the occupant temporarily increases, the surface temperature is detected as if only the part where the surface temperature is measured at that time has a lower temperature, while other parts (where the surface temperature is measured when the wind volume is smaller) has a higher temperature. This apparent temperature distribution is different from the actual temperature distribution.

Particularly, the temperature of a portion where heat capacity is relatively small, such as an occupant's hair or clothes, easily changes with a change in the wind volume of the air-conditioned wind. Therefore, when the surface temperature is measured at different timings for different locations, erroneous detection of the temperature distribution is more likely to occur.

For example, when air conditioning control is performed based on an average temperature of the entire occupant and such erroneous detection as described above occurs, the average temperature may be inaccurately calculated, thus leading to an inappropriate air conditioning control being performed. In addition, for example, when control is performed such that the air-conditioned wind is concentrated to hit a local high-temperature portion for cooling, there is a possibility that, although the entire temperature is actually uniform, concentrated cooling with respect to one part is performed due to temperature distribution being detected erroneously.

The present disclosure has been made in view of such subjects, and an object of the present disclosure is to provide a vehicular air-conditioner which may prevent occurrences of erroneous detection of temperature distribution as well as performing an air conditioning control while moving a measurement location of a surface temperature.

To address the above issues, a vehicular air-conditioner according to the present disclosure includes a wind changing unit that changes at least one of a wind volume and a wind direction of an air-conditioned wind to be blown out into a vehicle interior, a temperature detection unit that detects a surface temperature of an object based on radiation from the object, a detection position changing unit that changes a position of a detection target region, the detection target region being a region in which the surface temperature is to be detected by the temperature detection unit, and a control unit that controls operation of the wind changing unit and operation of the detection position changing unit. The control unit controls at least one of the operation of the wind changing unit and the operation of the detection position changing unit to suppress changes in the wind volume of the air-conditioned wind in the detection target region when a part of a surface of an occupant is in the detection target region.

In such a vehicular air-conditioner, when a part of the surface of the occupant is in a detection target region, control is performed to bring it into a state in which a change in the wind volume of the air-conditioned wind is suppressed in the detection target region. The expression "a state in which a change in the wind volume is suppressed" means a state in which a rate of change in the wind volume at a portion that is in the detection target region is smaller than a rate of change in the wind volume when the portion is not in the detection target region. In addition, such a state includes a state in which air-conditioned wind does not reach the detection target region.

Such a control as described above includes, for example, adjusting an orientation of the temperature detection unit such that a region with which the area directly hit by the air-conditioned wind does not overlap with the detection target region. Such a control also includes adjusting the direction of the air-conditioned wind to be blown out such that the air-conditioned wind directly hits an area that does not overlap with the detection target region.

As a result of the controls as described above, even when the surface temperature of the occupant temporarily changes with a change in the wind volume of the air-conditioned wind, the area where such a temporary change occurs is not in the detection target region. Therefore, erroneous detection of the temperature distribution is prevented.

According to the present disclosure, the vehicular air-conditioner capable of preventing the occurrence of erroneous detection of temperature distribution as well as performing the air conditioning control while moving the measurement location of the surface temperature.

EMBODIMENTS FOR CARRYING OUT INVENTION

Hereinafter, the present embodiment will be described with reference to the accompanying drawings. To facilitate understanding the description, the same reference numerals are assigned to the same elements in each drawing as much as possible to omit repetitious descriptions.

Figure 1:
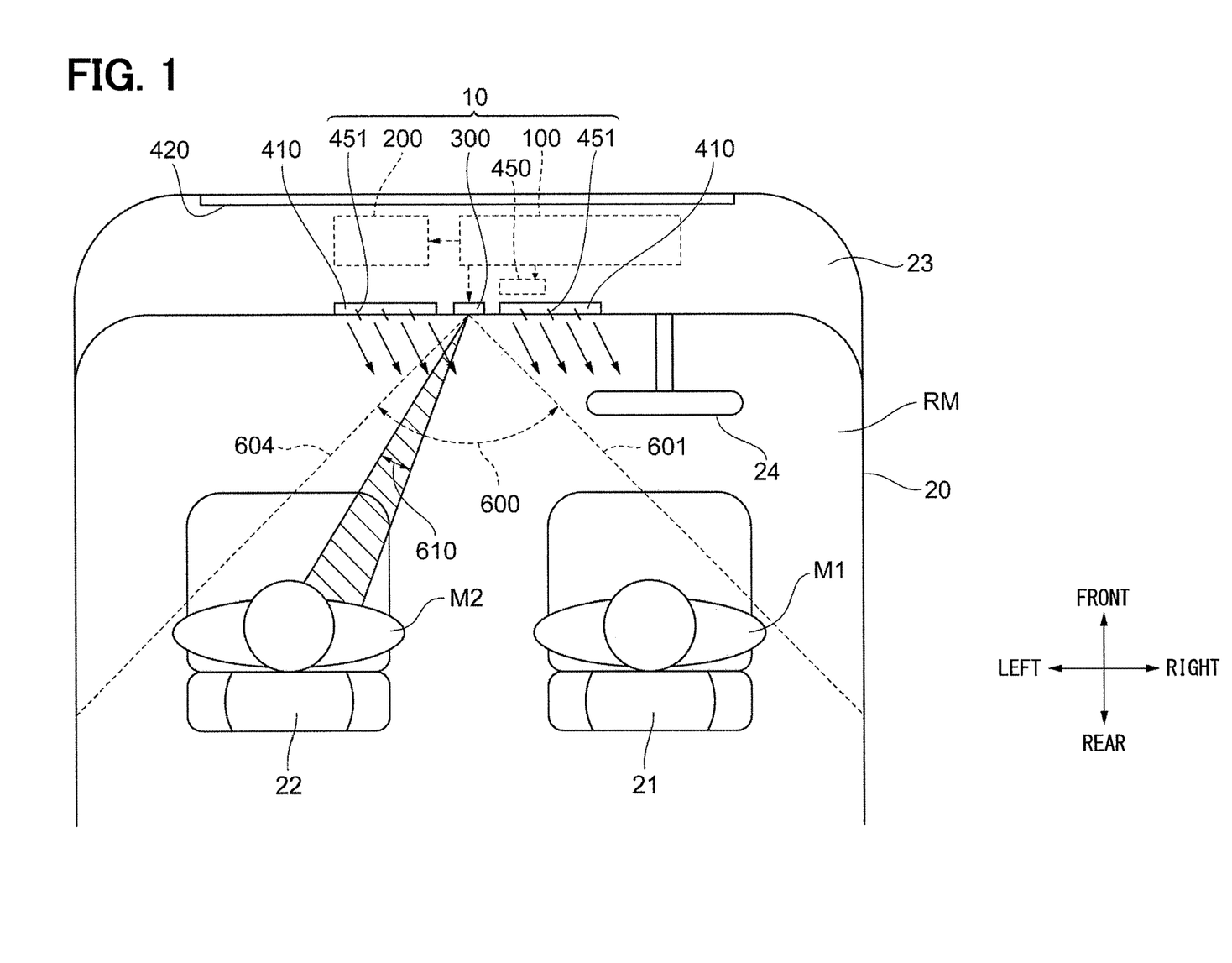
FIG. 1 is a diagram showing a state in which a vehicular air-conditioner according to the present embodiment is mounted on a vehicle.

A vehicular air-conditioner 10 according to the present embodiment is provided in a vehicle 20 to conditioning air in a vehicle interior RM of the vehicle 20. FIG. 1 schematically shows a configuration inside the vehicle interior RM in a top view.

Firstly, the vehicle 20 will be described. On a front side portion of the vehicle 20, a driver seat 21 that is a seat on the right side and a passenger seat 22 that is a seat on the left side are provided adjacently to each other. FIG. 1 shows a driver M1 sitting in the driver seat 21 and a passenger M2 sitting in the passenger seat 22. Reference numeral 24 represents a steering wheel. The driver seat 21 corresponds to a "first seat" in the present embodiment. The driver seat 22 corresponds to a "second seat" in the present embodiment.

An instrument panel 23 is provided on a front side of the driver seat 21 and the passenger seat 22. In the central portion of the instrument panel 23 in the right-left direction, two vent holes 410, which are outlets for air-conditioned wind from the vehicular air-conditioner 10, are formed and aligned along the right-left direction. These two vent holes 410 are openings formed to face the driver seat 21 and the passenger seat 22, that is, to face toward a rear side of the vehicle 20. The wind direction of the air-conditioned wind to be blown out from each of the vent holes 410 can be changed by a plurality of louvers 451 of a swing register 450 to be described later.

A vent hole 420, which is another outlet for air-conditioned wind from the vehicular air-conditioner 10, is formed in a portion of the forefront side of the instrument panel 23 to be oriented upward. The vent hole 420 is an opening having an elongated linear shaped and is formed to extend in the right-left direction. When the air-conditioned wind is blown out from the vent hole 420, the air-conditioned wind hits a windshield (not shown) of the vehicle 20. This can defrost the windshield.

The vehicle 20 also includes a vent hole (not shown) for blowing out the air-conditioned wind from the vehicular air-conditioner 10 toward feet of the driver M1 and the passenger M2.

The vehicular air-conditioner 10 includes a control unit 100, an air conditioning unit 200, an IR sensor 300, and the swing register 450.

The control unit 100 is a computer system including a CPU, a ROM, and a RAM. The control unit 100 controls the entire operation of the vehicular air-conditioner 10. A specific configuration and function of the control unit 100 will be described later.

The air conditioning unit 200 generates air-conditioned wind and sends the air-conditioned wind into the vehicle interior RM. The air conditioning unit 200 includes a refrigeration cycle (not shown). A heat exchanger of the refrigeration cycle performs heat exchange between air and a refrigerant, thereby generating the air-conditioned wind.

The air conditioning unit 200 further includes a blower 201 (not shown in FIG. 1, see FIG. 2) for sending out air. The blower 201 is a so-called blower fan. When the blower 201 sends air to the refrigeration cycle, the temperature of the air is adjusted, and the air becomes air-conditioned wind and is blown out into the vehicle interior RM through a duct (not shown). The outlet of the air-conditioned wind blown out is any of a plurality of the vent holes (410, 420, etc.). The rotation speed of the blower 201 is controlled by the control unit 100, whereby the wind volume of the air-conditioned wind is adjusted.

The air conditioning unit 200 is provided with a vent hole switching door (not shown) for switching the outlet of the air-conditioned wind. The vent hole switching door is switchable between opening and closing by using the driving force of a vent hole switching motor 202 (not shown in FIG. 1, see FIG. 2). The operation of the vent hole switching motor 202 is controlled by the control unit 100. This allows for switching between a "face mode" in which air-conditioned wind is blown toward the upper body of, e.g., the driver M1 from the vent holes 410, a "defrosting mode" in which air-conditioned wind is blown toward the windshield from the vent hole 420, and a "foot mode" in which air-conditioned wind is blown toward the feet of, e.g., the driver M1 from a non-illustrated vent hole. A "bi-level mode" in which the air-conditioned wind is blown out to both the upper body and the feet of, e.g., the driver M1 is also selectable. In this manner, the air conditioning unit 200 is capable of changing the wind volume and the wind direction of the air-conditioned wind blown into the vehicle interior RM, and corresponds to a "wind changing unit" in the present embodiment.

The air conditioning unit 200 is also provided with an inside/outside air switching door (not shown) for switching a path of introducing air to be guided to the refrigeration cycle. The inside/outside air switching door is switchable between opening and closing by using the driving force of an inside/outside air switching motor 203 (not shown in FIG. 1, see FIG. 2). The operation of the inside/outside air switching motor 203 is controlled by the control unit 100. This allows for switching between an "outside air circulation mode" in which air introduced from an outside of the vehicle 20 is blown out as the air-conditioned wind, and an "inside air circulation mode" in which air introduced from an inside of the vehicle interior RM is blown out as the air-conditioned wind.

The IR sensor 300 is a temperature sensor that detects a surface temperature of an object, based on radiation (infrared rays) from the object. The IR sensor 300 is provided between the two vent holes 410 of the instrument panel 23, namely, in the middle in the right-left direction of the instrument panel 23. The IR sensor 300 corresponds to a "temperature detection unit" in the present embodiment.

The vehicular air-conditioner 10 is configured to detect a surface temperature of occupants (e.g., the driver M1 and the passenger M2) with the IR sensor 300, and to perform air conditioning control based on the surface temperature. A temperature, a volume, and a direction of the air-conditioned wind are adjusted based not only on an air temperature in the vehicle interior RM but also on a surface temperature of each occupant. This allows the occupants to feel a comfortable thermal sensation.

The IR sensor 300 has a relatively narrow visual field, and the surface temperature of the entire occupants cannot be detected at one time. In FIG. 1, the visual field of the IR sensor 300 is represented by a reference numeral 610. Hereinafter, this visual field is also referred to as a "visual field 610". In addition, a surface of the object included in the visual field 610, namely, a region at which the surface temperature is to be measured at the present moment, is also referred to as a "detection target region".

The IR sensor 300 is provided with an IR motor 301 (not shown in FIG. 1, see FIG. 2) for changing the orientation of the IR sensor 300 to move the visual field 610. When the IR motor 301 is driven, the IR sensor 300 performs a swing motion, and the visual field 610 moves in the right-left direction. In accordance with this movement, the detection target region also moves in the right-left direction. A range within which the visual field 610 can move is shown as an IR driving range 600 in FIG. 1. A broken line 601 defines the rightmost end portion of the IR driving range 600. A broken line 604 defines the leftmost end portion of the IR driving range 600. As shown in FIG. 1, the IR driving range 600 defined by the broken line 601 and the broken line 604 covers both the whole of the driver M1 and the whole of the passenger M2.

The IR sensor 300 can measure the distribution of the surface temperature of the whole of the driver M1 and the whole of the passenger M2 while gradually changing the position of the detection target region by using the driving force of the IR motor 301. The operation of the IR motor 301 is controlled by the control unit 100. The IR motor 301 corresponds to a "detection position changing unit" in the present embodiment.

The swing register 450 is a mechanism for adjusting the wind direction of the air-conditioned wind to be blown out from the vent holes 410. The swing register 450 includes a louver 451 and an SR motor 452 (not shown in FIG. 1, see FIG. 2). The louver 451 includes a plurality of plate-shaped bodies aligned along the vent holes 410. The air-conditioned wind to be blown out from the vent holes 410 is guided by the respective louvers 451, thereby changing the wind direction.

Each louver 451 is driven by the SR motor 452 to change its direction. That is, the direction of the air-conditioned wind guided by the louvers 451 is adjusted by the driving force of the SR motor 452. The operation of the SR motor 452 is controlled by the control unit 100. As described above, the SR motor 452 changes the wind direction of the air-conditioned wind to be blown out into the vehicle interior RM, and corresponds to a "wind changing unit" in the present embodiment.

The configuration of the control unit 100 will be described with reference to FIG. 2. The control unit 100 includes, as functional control blocks, an air-conditioning setting section 110, a wind volume change estimating section 120, an air-conditioning correcting section 130, an IR direction determining section 140, an SR direction determining section 150, and an IR operation setting section 160.

The air-conditioning setting section 110 determines the wind volume, the wind direction, etc. of the air-conditioned wind to be blown into the vehicle interior RM based on measured values of various sensors provided in the vehicle 20. In addition to the measured value (a surface temperature) from the IR sensor 300 described above, each of measured values measured by an inside air temperature sensor 501, an outside air temperature sensor 502, a solar radiation sensor 503, and a humidity sensor 504 is input to the air-conditioning setting section 110.

The inside air temperature sensor 501 measures an air temperature inside the vehicle interior RM. The outside air temperature sensor measures an air temperature outside the vehicle 20. The solar radiation sensor 503 detects an amount of sunlight incident on an inside the vehicle interior. The humidity sensor 504 measures a humidity inside the vehicle interior RM.

A set value from a target temperature setting unit 505 provided in the vehicle 20 is input to the air-conditioning setting section 110. The target temperature setting unit 505 is operated by an occupant in the vehicle 20 to set a target temperature of air conditioning. When the target temperature is set by the occupant, the set value of the target temperature is input from the target temperature setting unit 505 to the air-conditioning setting section 110.

The air-conditioning setting section 110 includes a rotation speed setting section 111, a vent hole setting section 112, an inside/outside air setting section 113, and an SR operation setting section 114. The rotation speed setting section 111 determines a rotation speed of the blower 201. The rotation speed of the blower 201 is set according to the wind volume of the air-conditioned wind to be blown into the vehicle interior RM. The blower 201 is controlled to operate at the rotation speed determined by the air-conditioning setting section 110. The rotation speed is determined by taking into consideration comprehensively the measured values input from the various sensors. Alternatively, the rotation speed may be determined based on the setting manually performed by the driver M1. The blower 201 may be controlled to operate at a rotation speed different from the determined rotation speed due to correction performed by a rotation speed correcting section 131 to be described later.

The vent hole setting section 112 determines the vent hole to be used as the outlet of the air-conditioned wind. That is, the vent hole setting section 112 determines the air-conditioned wind is to be blown out either in the face mode, the defrosting mode, the foot mode, or the bi-level mode described above. This determination is carried out by taking into consideration comprehensively the measured values input from the various sensors. Alternatively, the determination may be made based on the setting manually performed by the driver M1. In addition, due to correction performed by a vent hole correcting section 132, which will be described later, the air-conditioned wind may be blown out in a mode different from the determined mode.

The inside/outside air setting section 113 determines whether the vehicular air-conditioner 10 operates in the outside air circulation mode or the inside air circulation mode. Such determination is made taking into consideration comprehensively the measured values input from the various sensors. Alternatively, the determination may be made based on the setting manually performed by the driver M1. In addition, due to correction performed by an inside/outside air correcting section 133 to be described later, the vehicular air-conditioner 10 may operate in a mode different from the determined mode.

The SR operation setting section 114 determines the operation of the swing register 450, namely, a control method of the SR motor 452. A direction in which the air-conditioned wind is to be directed is determined by the SR operation setting section 114. Such determination is made by taking into consideration comprehensively the measured values input from the various sensors. Alternatively, the direction may be determined based on the setting manually performed by the driver M1. The swing register 450 may be controlled such that an operation different from the determined operation is performed due to correction performed by an SR operation correcting section 134 to be described later.

The wind volume change estimating section 120 estimates a rate of change in the wind volume of the air-conditioned wind at a specific location in the vehicle interior RM, based on various items (e.g., the rotation speed of the blower 201) determined by the air-conditioning setting section 110 and a value measured by an SR position sensor 453, which will be described later. The "specific location" is any location that the air-conditioned wind blown out from the vent holes 410 can reach, such as a part of the surface of the driver M1.

The change rate of the wind volume estimated by the wind volume change estimating section 120 is input to an air-conditioning correcting section 130 to be described later. The rate of change in the wind volume referred to here may be a numerical value expressed in units such as "$m^3/h/sec$", for example, or may be a numerical value representing a level number of the change to be expected after a predetermined time has elapsed by replacing the magnitude of the wind volume with a dimensionless number of ten stages, for example.

The air-conditioning correcting section 130 controls the blower 201 etc. after adding various changes as needed to the various items (e.g., the rotation speed of the blower 201) determined by the air-conditioning setting section 110. The air-conditioning correcting section 130 includes the rotation speed correcting section 131, the vent hole correcting section 132, the inside/outside air correcting section 133, and the SR operation correcting section 134.

The rotation speed correcting section 131 controls the rotation speed of the blower 201. The rotation speed correcting section 131 basically controls the blower 201 to operate at the rotation speed determined by the rotation speed setting section 111. However, when the rate of change in the wind volume estimated by the wind volume change estimating section 120 is larger, the blower 201 is controlled to operate at a (corrected) rotation speed different from the rotation speed determined by the rotation speed setting section 111. Details of such correction will be described later.

The vent hole correcting section 132 controls the operation of the vent hole switching motor 202. The vent hole correcting section 132 basically controls the vent hole switching motor 202 such that the air-conditioned wind is to be blown out in the mode (e.g., the face mode) determined by the vent hole setting section 112. However, when the rate of change in the wind volume estimated by the wind volume change estimating section 120 is larger, the vent hole switching motor 202 is controlled to operate in a (corrected) mode different from the mode determined by the vent hole setting section 112. Details of such correction will be described later.

The inside/outside air correcting section 133 controls the operation of the inside/outside air switching motor 203. The inside/outside air correcting section 133 basically controls the inside/outside air switching motor 203 such that air conditioning is performed in the mode (e.g. the outside air circulation mode) determined by the inside/outside air setting section 113. However, when the rate of change in the wind volume estimated by the wind volume change estimating section 120 is larger, the inside/outside air switching motor 203 is controlled such that the air conditioning is performed in a (corrected) mode different from the mode determined by the inside/outside air setting section 113. Details of such correction will be described later.

The SR operation correcting section 134 controls the operation of the SR motor 452. The SR operation correcting section 134 basically controls the SR motor 452 to direct the air-conditioned wind in the direction determined by the SR operation setting section 114. However, when the rate of change in the wind volume estimated by the wind volume change estimating section 120 is larger, the SR motor 452 is controlled to direct the air-conditioned wind in a (corrected) direction different from the mode determined by the SR operation setting section 114. Details of such correction will be described later.

The IR direction determining section 140 determines which direction the IR sensor 300 faces in, based on a value measured by an IR position sensor 302. The IR position sensor 302 is a pulse counter built in, for example, the IR sensor 300, and measures a change amount in position of the movable portion driven by the IR motor 301 (e.g., the rotation angle of the sensor head).

In addition to determining which direction the IR sensor 300 faces in, the IR direction determining section 140 also determines whether a surface of the occupant (the driver M1 or the passenger M2) is included in the current detection target region. Pre-stored information on the position of the occupant is taken into consideration when such a determination is made. The information on the position of the occupant may be pre-stored as a setting value in this way, or may be acquired every time based on a value measured by the IR sensor 300. According to this mode, even when a driver M1 or the like having a different physique sits in the driver seat 21 or the like, whether a surface of the occupant is included in the current detection target region can be accurately determined.

The SR direction determining section 150 determines which direction each louver 451 of the swing register 450 is directed in, based on a value measured by the SR position sensor 453. That is, the SR direction determining section 150 determines the wind direction of the air-conditioned wind to be blown out from the vent hole 410. The SR position sensor 453 is a pulse counter built in, for example, the SR motor 452, and measures a change amount in position of the movable portion driven by the SR motor 452 (e.g., the rotation angle of the louver 451).

In addition to determining which direction each louver 451 faces in, the SR direction determining section 150 also determines whether a surface of the occupant (the driver M1 or the passenger M2) is included in the area where the air-conditioned wind directly reaches. Pre-stored information on the position of the occupant is taken into consideration when such a determination is made. As described above, the information on the position of the occupant may be acquired every time the determination is made, based on the value measured by the IR sensor 300.

The IR operation setting section 160 determines which direction the IR sensor 300 is to be directed in, based on both the determination result input from the IR direction determining section 140 and the determination result input from the SR direction determining section 150. That is, the IR operation setting section 160 determines which part in the vehicle interior RM is to be set as the detection target region. The IR operation setting section 160 controls the operation of the IR motor 301 such that the determined detection target region is included in the visual field 610.

Since the visual field of the IR sensor 300 used in the present embodiment is relatively narrow, the surface temperature of the occupant as a whole cannot be acquired at one time (at the same time). Therefore, as described above, by making the IR sensor 300 perform the swing motion, the visual field 610 is moved in the right-left direction while the IR sensor 300 partially acquires the surface temperature of the occupant to finally acquire the entire temperature distribution.

In the present embodiment, the driving of the IR sensor 300, namely, the movement of the visual field 610 in the right-left direction, is performed at such a rate as to change by 0.5 degrees each 200 msec. Accordingly, when an angle of the IR driving range 600 shown in FIG. 1 is 150 degrees, it takes 120 seconds for the IR sensor 300 to make a round-trip in the IR driving range. Since the speed of the swing motion of the IR sensor 300 has a trade-off relationship with the resolution and accuracy of the acquired temperature distribution, it is not easy to increase the speed of the swing motion. As a result, when the surface temperature is measured at such a speed, for example, the timing of when the temperature of the left side portion of the driver M1 is measured and the timing of when the temperature of the right side portion is measured are significantly separated from each other.

Accordingly, for example, when the temperature of the right side portion of the driver M1 is measured after measuring the left side portion of the driver M1, if the wind volume of the air-conditioned wind reaching the driver M1 increases during this time, it may be detected as if only the temperature of the right side portion of the driver M1 is low. The temperature distribution as described above (only the temperature of the right side portion is low) is different from the actual temperature distribution.

In this way, when the wind volume of the air-conditioned wind temporarily increases, if the air-conditioned wind directly hits a region within the detection target region, there is a possibility that erroneous detection of the temperature distribution occurs. To prevent such erroneous detection, it is also conceivable to use a wide angle IR sensor capable of measuring the surface temperature in the entire IR driving range 600 all at once. However, this would require a wide-angle lens or a high resolution sensor, so the cost of the IR sensor would increase.

Therefore, in the vehicular air-conditioner 10 according to the present embodiment, the IR sensor 300 having a narrower viewing angle is used instead of the higher-priced IR sensor as described above, but occurrence of erroneous detection may still be prevented by appropriately designing, for example, the operation of the IR motor 301.

Figure 3:
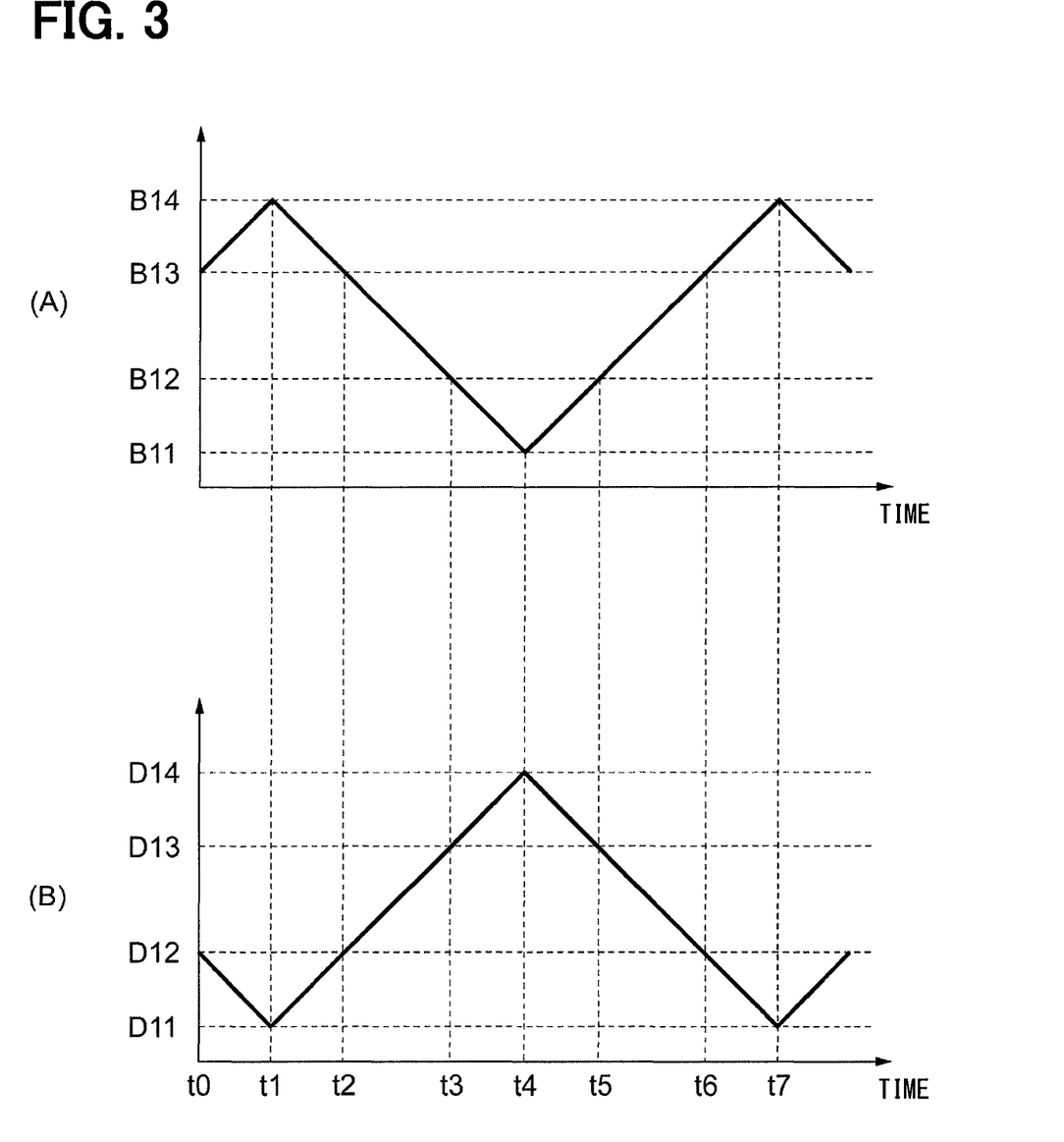
FIG. 3 is graphs showing a change in an orientation of an IR sensor and a change in a wind direction.

The outline of the control performed for this prevention will be described with reference to FIGS. 3 to 4. FIG. 3(A) shows the change in the direction of the louver 451, namely, a change with time in the wind direction of the air-conditioned wind blown out from the vent holes 410. The vertical axis of the graph shows the measured value of the SR position sensor 453. Value B11 is a measured value of the SR position sensor 453 when at least a part of the air-conditioned wind directly hits the rightmost portion of the surface of the driver M1. That is, value B11 is a value of the SR position sensor 453 when the direction of the louver 451 moves further to the right side such that the air-conditioned wind does not directly reach the driver M1.

Value B12 is a measured value of the SR position sensor 453 when at least a part of the air-conditioned wind directly hits the leftmost portion of the surface of the driver M1. That is, value B12 is a value of the SR position sensor 453 when the direction of the louver 451 moves further to the left side such that the air-conditioned wind does not directly reach the driver M1.

Value B13 is a measured value of the SR position sensor 453 when at least a part of the air-conditioned wind directly hits the rightmost position of the surface of the passenger M2. That is, value B13 is a value of the SR position sensor 453 when the direction of the louver 451 moves further to the right side such that the air-conditioned wind does not directly reach the passenger M2.

Value B14 is a measured value of the SR position sensor 453 when at least a part of the air-conditioned wind directly hits the leftmost position of the surface of the passenger M2. That is, value B14 is a value of the SR position sensor 453 when the direction of the louver 451 moves further to the left side such that the air-conditioned wind does not directly reach the passenger M2.

In the example shown in FIG. 3(A), the air-conditioning setting section 110 (see FIG. 2) controls the SR motor 452 to the louver 451 in the right-left direction on a constant cycle. Specifically, the SR motor 452 is controlled to move the louver 451 toward the left side during a period from time t0 to time t1, and to move the louver 451 toward the right side during a period from time t2 to time t4. Sequentially, during a period from time t4 to time t7, the SR motor 452 is controlled to move the louver 451 to the left again.

During the period from time t0 to time t2, the measured value of the SR position sensor 453 is within the range from value B13 to value B14. This means that the air-conditioned wind blown out directly hits at least a part of the passenger M2.

During the period from time t2 to time t3, the measured value of the SR position sensor 453 is within the range from value B12 to value B13. This means that the air-conditioned wind blown out directly hits neither the driver M1 nor the passenger M2, and passes therebetween.

During the period from time t3 to time t5, the measured value of the SR position sensor 453 is within the range from value B11 to value B12. This means that the air-conditioned wind blown out directly hits at least a part of the driver M1.

During the period from time t5 to time t6, the measured value of the SR position sensor 453 is within the range from value B12 to value B13. This means that the air-conditioned wind blown out directly hit neither the driver M1 nor the passenger M2, and passes therebetween. After time t6, the wind direction of the air-conditioned wind repeatedly changes similarly to that during the period from time t0 to time t6.

In this manner, the wind direction of the air-conditioned wind to be blown out is gradually changed to alternate between a state in which the air-conditioned wind reaches the driver seat 21 in which the driver M1 sits and a state in which the air-conditioned wind reaches the passenger seat 22 in which the passenger M2 sits. Such operation is achieved by the SR motor 452.

When the wind direction of the air-conditioned wind changes as described above, the IR operation setting section 160 of the control unit 100 controls the IR motor 301 such that an area of the occupant's surface that the air-conditioned wind directly hits and the detection target region do not overlap with each other. Such control is performed by taking into consideration both the determination result of the IR direction determining section 140 and the determination result of the SR direction determining section 150.

A specific control mode of the IR motor 301 will be described. FIG. 3(B) shows a change with time of the orientation of the IR sensor 300. The vertical axis of the graph shows the measured value of the IR position sensor 302. Value D11 is a measured value of the IR position sensor 302 when the detection target region includes the rightmost portion of the surface of the driver M1. That is, value D11 is a value of the IR position sensor 302 when the visual field 610 moves further to the right side such that the surface of the driver M1 is no longer included in the detection target region.

Value D12 is a measured value of the IR position sensor 302 when the leftmost portion of the surface of the driver M1 is included in the detection target region. That is, value D12 is a value of the IR position sensor 302 when the visual field 610 moves further to the left side such that the surface of the driver M1 is no longer included in the detection target region.

Value D13 is a measured value of the IR position sensor 302 when the rightmost portion of the surface of the passenger M2 is included in the detection target region. In other words, value D13 is a value of the IR position sensor 302 when the visual field 610 moves further to the right side such that the surface of the passenger M2 is no longer included in the detection target region.

Value D14 is a measured value of the IR position sensor 302 when the leftmost portion of the surface of the passenger M2 is included in the detection target region. That is, value D14 is a value of the IR position sensor 302 when the visual field 610 moves further to the left side such that the surface of the passenger M2 is no longer included in the detection target region.

Figure 4:
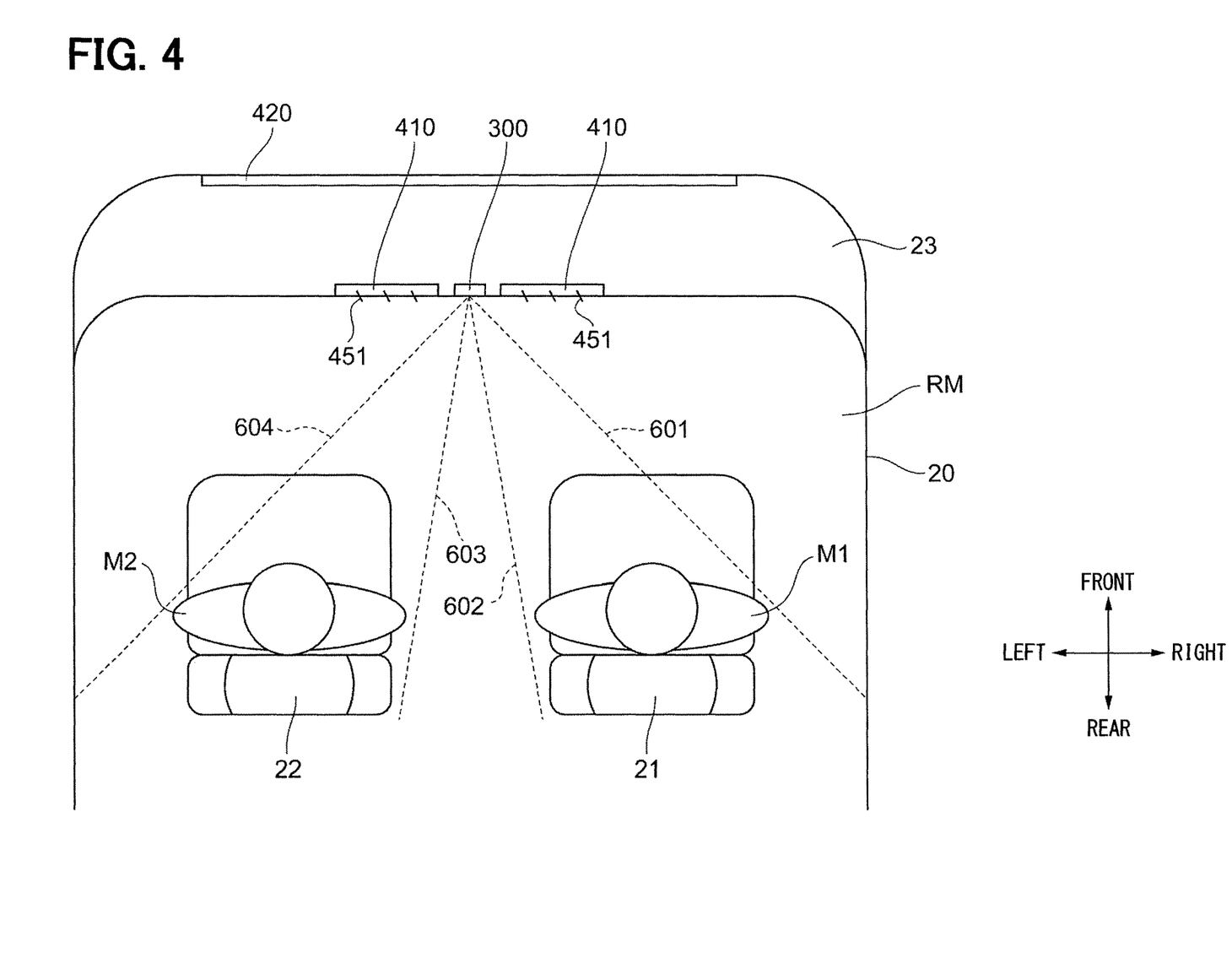
FIG. 4 is a diagram showing a range in which the orientation of the IR sensor changes.

When the measured value of the IR position sensor 302 is within the range from value D11 to value D12, at least a part of the region between a broken line 601 and a broken line 602 shown in FIG. 4 is included in the visual field 610. This means that a part of the surface of the driver M1 is included in the detection target region. In addition, when the measured value of the IR position sensor 302 is within the range from value D13 to value D14, at least a part of the region between a broken line 603 and a broken line 604 shown in FIG. 4 is included in the visual field 610. This means that a part of the surface of the passenger M2 is included in the detection target region.

In the example shown in FIG. 3(B), the IR operation setting section 160 (see FIG. 2) controls the IR motor 301 to swing the orientation of the IR sensor 300 (and as a result, the detection target region) in the right-left direction. Specifically, the IR motor 301 is controlled to move the detection target region toward the right side during the period from time t0 to time t1, and to move the detection target region toward the left side during the period from time t1 to time t4. Sequentially, during the period from time t4 to time t7, the IR motor 301 is controlled to move the detection target region toward the right side again.

During the period from time t0 to time t2, the measured value of the IR position sensor 302 is within the range from value D11 to value D12. This means that at least a part of the surface of the driver M1 is included in the detection target region. At this time, since the air-conditioned wind does not directly hit the surface of the driver M1, the air-conditioned wind does not directly reach the detection target region. In other words, the IR motor 301 is controlled such that the surface temperature of the driver M1 is measured by the IR sensor 300 only during the period in which the air-conditioned wind does not directly hit the surface of the driver M1.

During the period from time t2 to time t3, the measured value of the IR position sensor 302 is within the range from value D12 to value D13. This means that neither the surface of the driver M1 nor the surface of the passenger M2 is included in the detection target region.

During this period, the air-conditioned wind reaches a position between the driver seat 21 and the passenger seat 22. The direction in which the position of the detection target region changes (the left direction) is opposite to the direction in which an arrival location of the air-conditioned wind changes (the right direction). Since the IR motor 301 is controlled to operate in this manner, the area that the air-conditioned wind directly reaches and the detection target region are reliably prevent from overlapping with each other on the surface of the occupant.

During the period from time t3 to time t5, the measured value of the IR position sensor 302 is within the range from value D13 to value D14. This means that at least a part of the surface of the passenger M2 is included in the detection target region. At this time, since the air-conditioned wind does not directly hit the surface of the passenger M2, the air-conditioned wind does not directly reach the detection target region. In other words, the IR motor 301 is controlled such that the surface temperature of the passenger M2 is measured by the IR sensor 300 only during the period in which the air-conditioned wind does not directly hit the surface of the passenger M2.

During the period from time t5 to time t6, the measured value of the SR position sensor 453 is within the range from value B12 to value B13. This means that neither the surface of the driver M1 nor the surface of the passenger M2 is included in the detection target region. During this period, the air-conditioned wind reaches a position between the driver seat 21 and the passenger seat 22. The direction in which the position of the detection target region changes (the right direction) is opposite to the direction in which the arrival location of the air-conditioned wind changes (the left direction). Since the IR motor 301 is controlled to perform such operation, it is surely prevented that the area that the air-conditioned wind directly reaches and the detection target region overlap with each other on the surface of the occupant. After time t6, similarly to that during the period from time t0 to time t6, the control is performed such that the orientation of the IR sensor 300 is repeatedly changed.

As described above, the operation of the IR motor 301 is controlled such that the passenger seat 22 is in the detection target region when the air-conditioned wind reaches the driver seat 21 and the driver seat 21 is in the detection target region when the air-conditioned wind reaches the passenger seat 22. As a result, the area that the air-conditioned wind directly reaches and the detection target region do not overlap with each other on the surface of any of the occupants (the driver M1 or the passenger M2) at any time.

Figure 5:
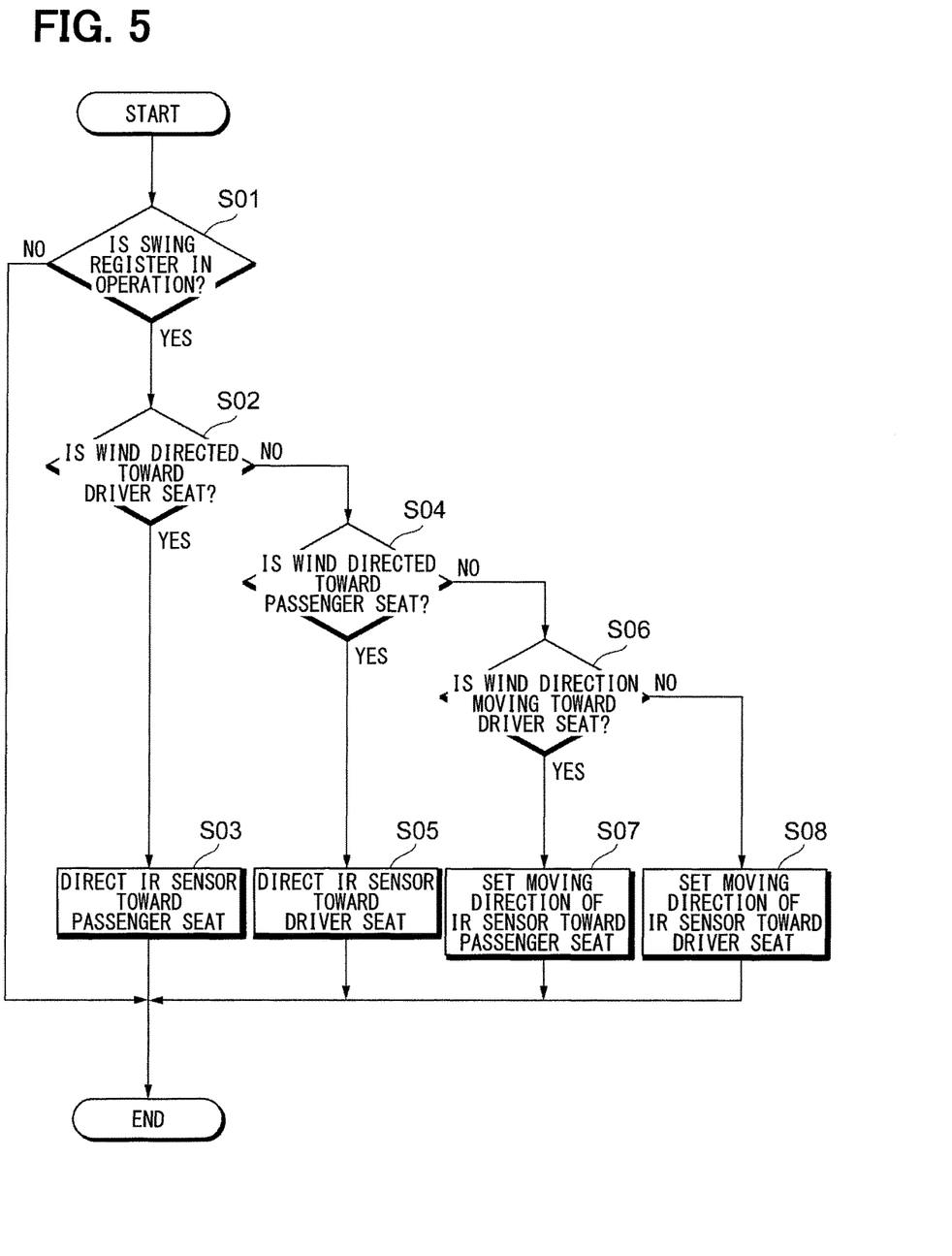
FIG. 5 is a flowchart showing a flow of processing performed by a controller of the vehicular air-conditioner according to the present embodiment.

With reference to FIG. 5, a flow of processing performed by the control unit 100 will be described. The series of processing shown in FIG. 5 is repeatedly executed each certain period.

In the first step S01, whether the swing register 450 is in operation is determined. When the swing register 450 is out of operation and the wind direction is fixed, a series of processing shown in FIG. 5 is ended. When the swing register 450 is in operation, the processing proceeds to step S02.

In step S02, it is determined whether the air-conditioned wind is directed toward the driver seat 21, specifically, whether the measured value of the SR position sensor 453 is within the range from value B11 to value B12. When the air-conditioned wind is directed toward the driver seat 21, the processing proceeds to step S03. In step S03, the operation of the IR motor 301 is controlled to make the IR sensor 300 face toward the passenger seat 22. Specifically, the operation of the IR motor 301 is controlled such that the measured value of the IR position sensor 302 is within the range from value B13 to value B14.

In step S02, when the air-conditioned wind is not directed toward the driver seat 21, the processing proceeds to step S04. In step S04, it is determined whether the air-conditioned wind is directed toward the passenger seat 22, specifically, whether the measured value of the SR position sensor 453 is within the range from value B13 to value B14. When the wind direction of the air-conditioned wind faces toward the passenger seat 22, the processing goes to step S05. In step S05, the operation of the IR motor 301 is controlled to make the IR sensor 300 face toward the driver seat 21. Specifically, the operation of the IR motor 301 is controlled such that the measured value of the IR position sensor 302 is within the range from value B11 to value B12.

In step S04, when the air-conditioned wind is not directed toward the passenger seat 22, the processing proceeds to step S06. In step S06, whether the direction in which the arrival location of the air-conditioned wind changes is the direction toward the driver seat 21 (i.e., the right side) is determined. When the arrival location of the air-conditioned wind is changing toward the right side, the processing proceeds to step S07. In step S07, the IR motor 301 is controlled such that the moving direction of the IR sensor 300, namely, the direction in which the position of the detection target region changes, is toward the passenger seat 22 (i.e., the left side). As a result, the direction in which the position of the detection target region changes is opposite to the direction in which the arrival location of the air-conditioned wind changes.

In step S06, when the arrival location of the air-conditioned wind is changing toward the passenger seat 22 (i.e., the left side), the processing proceeds to step S08. In step S08, the IR motor 301 is controlled such that the IR sensor 300 is directed toward the driver seat 21 (i.e., the right side). As a result, the direction in which the position of the detection target region changes is opposite to the direction in which the arrival location of the air-conditioned wind changes.

As described above, in the present embodiment, the operation of the IR motor 301 is controlled to bring it into a state in which the air-conditioned wind does not reach the detection target region (i.e., a state in which a change in wind volume is suppressed) when a part of the surface of the occupant is in the detection target region.

Figure 6:
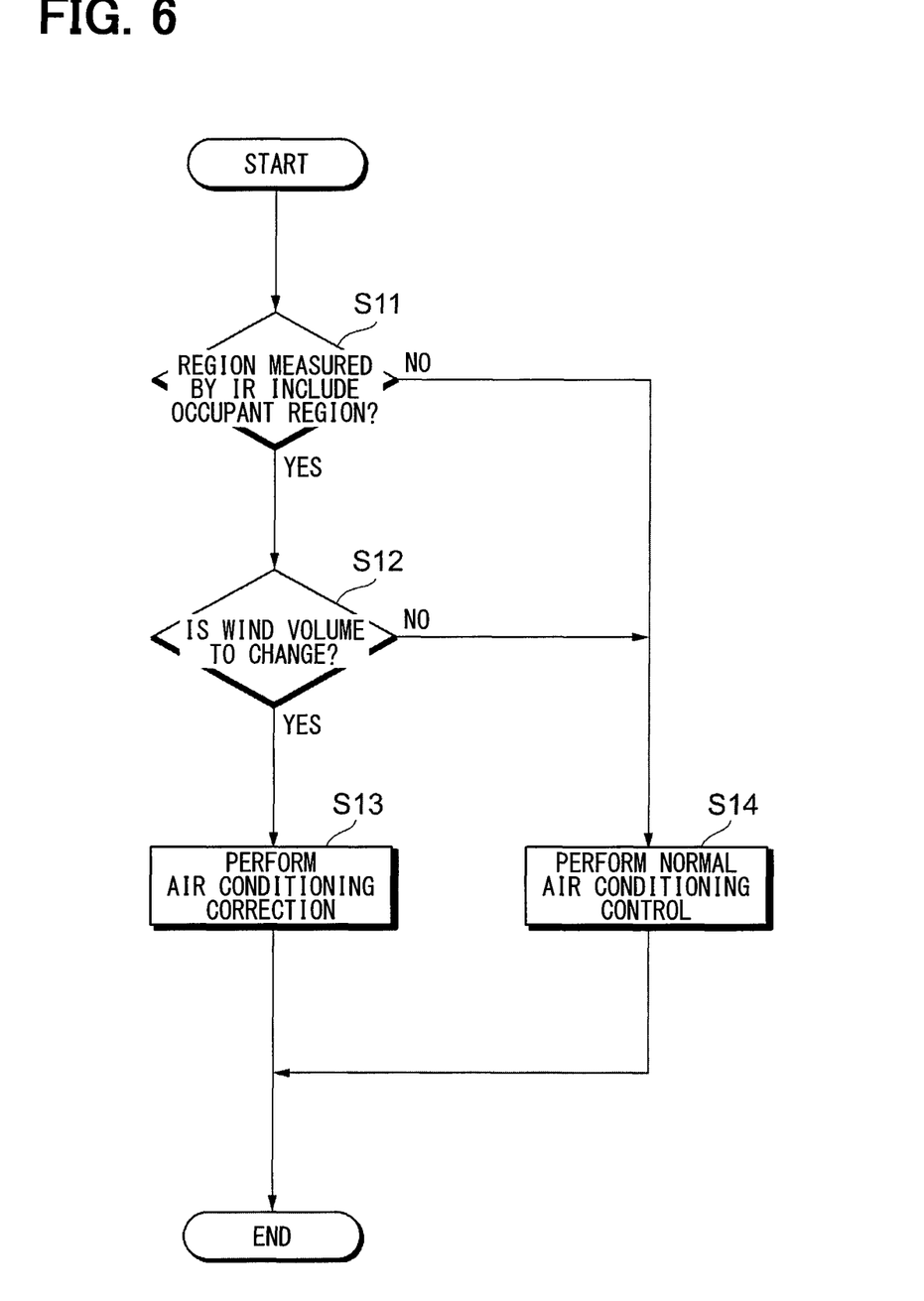
FIG. 6 is a flowchart showing a flow of processing performed by the controller of the vehicular air-conditioner according to the present embodiment.

Instead of such control, the vehicular air-conditioner 10 can suppress the change in wind volume in the detection target region while swinging the IR sensor 300 to change its orientation on a constant cycle without considering the arrival location of the air-conditioned wind. The contents of the processing performed for such purpose will be described with reference to FIG. 6. The series of processing shown in FIG. 6 is repeatedly executed by the control unit 100 each a certain period.

In the first step S11, it is determined whether the detection target region that is the region measured by the IR sensor 300 includes a part of the surface of an occupant (the driver M1 or the passenger M2). When a part of the occupant's surface is not included in the detection target region, the processing proceeds to step S14. In step S14, normal air conditioning control is performed. The normal air conditioning control is performed without considering a change in wind volume in the detection target region.

In step S11, when a part of the surface of the occupant is included in the detection target region, the processing proceeds to step S12. In step S11, in addition to when a part of the surface of the occupant is actually included in the detection target region, when a part of the surface of the occupant is to be included in the detection target region in a few seconds, the processing proceeds to step S12.

Figure 2:
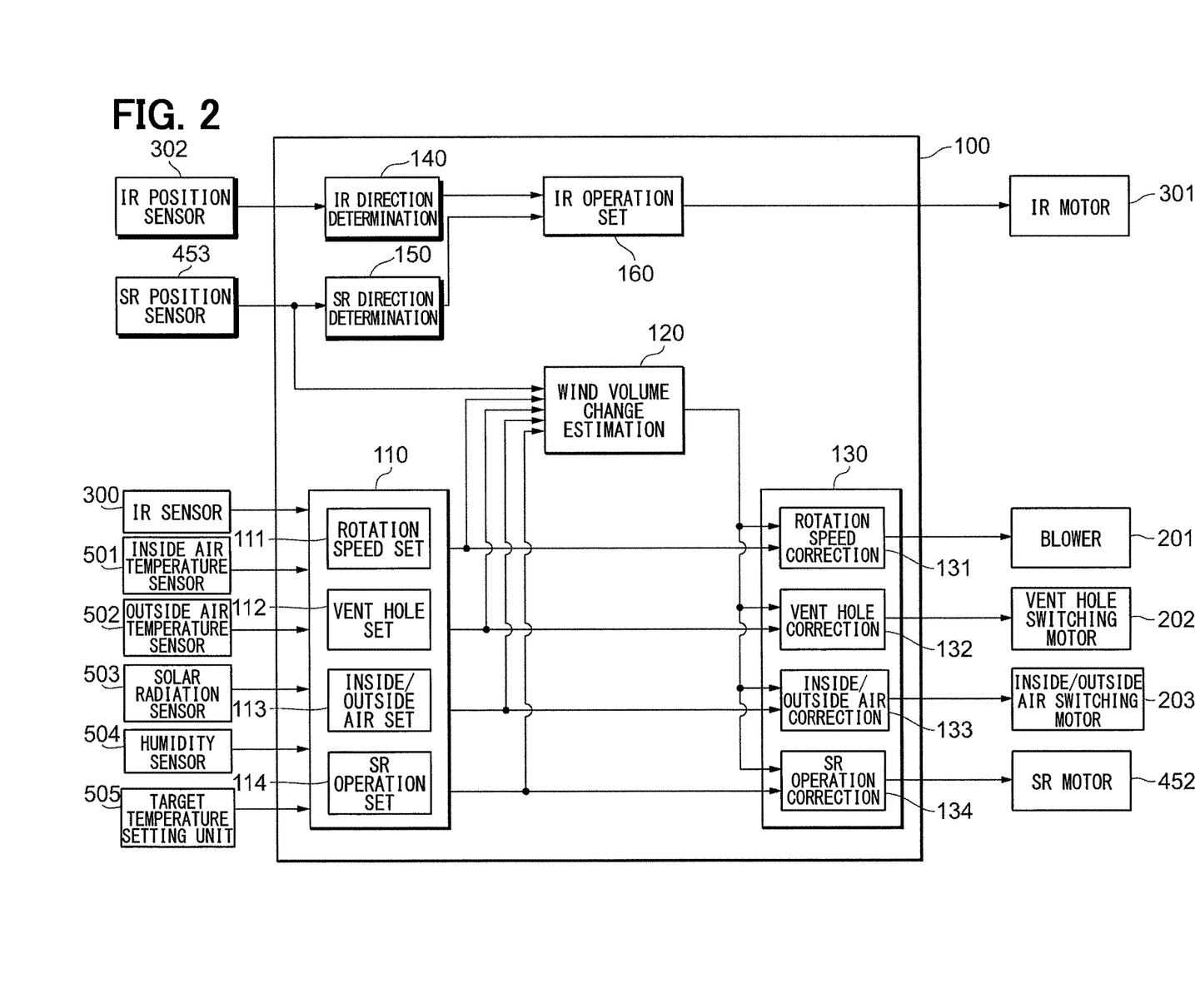
FIG. 2 is a block diagram schematically showing a configuration of the vehicular air-conditioner according to the present embodiment.

In step S12, the rate of change in wind volume of the air-conditioned wind in the detection target region is estimated by the wind volume change estimating section 120 (see FIG. 2). The "rate of change in wind volume" is a rate of change with respect to the change in wind volume estimated to occur in the detection target region in a few seconds, when the air conditioning control determined by the air-conditioning setting section 110 is assumed to be carried out.

In step S12, whether the estimated rate of change in wind volume exceeds a preset threshold value is further determined. That is, whether a larger change in wind volume is to occur in the detection target region in a few seconds is determined. When the rate of change in wind volume does not exceed the threshold value, the processing proceeds to step S14. Thereafter, the normal air conditioning control described above is executed.

When the rate of change in the wind volume exceeds the threshold value in step S12, the processing proceeds to step S13. In step S13, the air conditioning correction performed by the air-conditioning correcting section 130 is executed to suppress the change in the wind volume of the air-conditioned wind in the detection target region. In the vehicular air-conditioner 10, various modes can be executed as such air conditioning correction.

Examples of modes of air-conditioning correction include adjustment of the rotation speed of the blower 201 performed by the rotation speed correcting section 131. The rotation speed correcting section 131 temporarily sets an upper limit for the rate of change in the rotation speed of the blower 201, thereby suppressing the change in the rotation speed. Alternately, the change in the rotation speed of the blower 201 may be temporarily inhibited. By such air conditioning correction, a change in the wind volume of the air-conditioned wind reaching the detection target region can be suppressed. This makes it possible to prevent erroneous detection of the temperature distribution due to a temporary change in surface temperature.

As another mode of the air conditioning correction, the wind volume itself of the air-conditioned wind that reaches the detection target region may be reduced or set at zero. That is, the control unit 100 may control at least one of the wind changing unit (e.g., the air conditioning unit 200) and the detection position changing unit (e.g., the IR motor 301) such that the wind volume of the air-conditioned wind hitting the occupant is suppressed in an area of the detection target region that overlaps with the occupant. For example, by changing only the wind direction without changing the wind volume of the air-conditioned wind, the wind volume of the air-conditioned wind hitting an area of the detection target region that overlaps with the occupant may be set at zero as another mode.

Another example of modes of air-conditioning correction is control of the vent hole switching motor 202 performed by the vent hole correcting section 132. The vent hole correcting section 132 temporarily prohibits the operation of the vent hole switching motor 202. That is, switching the vent hole between the face mode, the defrosting mode, etc. is temporarily prohibited. Also with such air conditioning correction, a change in wind volume of the air-conditioned wind reaching the detection target region can be suppressed. This makes it possible to prevent erroneous detection of the temperature distribution due to a temporary change in surface temperature.

Other examples of modes of air-conditioning correction include control of the inside/outside air switching motor 203 performed by the inside/outside air correcting section 133. The inside/outside air correcting section 133 temporarily prohibits the operation of the inside/outside air switching motor 203. That is, the inside/outside air correcting section 133 temporarily prohibits switching between the outside air circulation mode and the inside air circulation mode. Also with such air conditioning correction, a change in wind volume of the air-conditioned wind reaching the detection target region can be suppressed. This makes it possible to prevent erroneous detection of the temperature distribution due to a temporary change in surface temperature.

Other examples of modes of the air conditioning correction include control of the SR motor 452 performed by the SR operation correcting section 134. The SR operation correcting section 134 controls the SR motor 452 such that the air-conditioned wind does not directly reach the detection target region. In other words, the SR motor 452 is controlled such that the air-conditioned wind reaches a portion other than the detection target region. Also with such air conditioning correction, the change in wind volume of the air-conditioned wind reaching the detection target region can be suppressed. This makes it possible to prevent erroneous detection of the temperature distribution due to a temporary change in surface temperature.

In the above description, when air-conditioned wind is blown toward the seats (the driver seat 21 and the passenger seat 22) provided on the front side of the vehicle 20 has been described, but the present invention is not limited thereto. For example, the configuration of the present disclosure can be applied to a vehicular air-conditioner configured such that air-conditioned wind is blown out from the ceiling toward the rear seats.

The present embodiments have been described with reference to specific examples. However, the present disclosure is not limited to these specific examples. Other examples obtained by those skilled in the art appropriately modifying these specific examples are also included in the scope of the present disclosure as long as the other examples include the features of the present disclosure. The elements, those arrangements, conditions, shapes, and the like of the respective specific examples described above are not limited to those exemplified, and can be appropriately changed. The combinations of respective elements included in the respective above-described specific examples can be appropriately changed as long as no technical inconsistency occurs.

What is claimed is:

1. A vehicular air-conditioner to be provided in a vehicle, the vehicular air-conditioner comprising:
the vehicular air-conditioner configured to:
change at least one of a wind volume and a wind direction of an air-conditioned wind to be blown out into a vehicle interior;
detect a surface temperature of an object based on radiation from the object;
change a position of a detection target region, the detection target region being a region in which the surface temperature is to be detected; and
control an operation of the wind change and an operation of the position detection,
wherein
the controlling of at least one of the operation of the wind change and the operation of the position detection suppresses changes in the wind volume of the air-conditioned wind in the detection target region when a part of a surface of an occupant is in the detection target region,
controlling the operation of the position detection is performed such that the detection target region does not overlap with an area of the surface of the occupant where the blown out air-conditioned wind reaches directly,
the vehicle is provided with a first seat and a second seat adjacent to each other,
the wind direction of the blown out air-conditioned wind alternates between a state in which the air-conditioned wind reaches the first seat and a state in which the air-conditioned wind reaches the second seat,
controlling the operation of the position detection is performed such that
the second seat is in the detection target region when the air-conditioned wind reaches the first seat, and
the first seat is in the detection target region when the air-conditioned wind reaches the second seat, and
when the air-conditioned wind reaches a position between the first seat and the second seat, controlling the operation of the position detection is performed such that a direction in which the position of the detection target region changes is opposite to a direction in which an arrival location of the air-conditioned wind changes.

2. The vehicular air-conditioner according to claim 1, wherein
when the part of the surface of the occupant is in the detection target region, controlling the operation of the wind change is performed such that the blown out air-conditioned wind does not directly reach the detection target region.

3. The vehicular air-conditioner according to claim 1, wherein
a plurality of vent holes are formed as outlets for air-conditioned wind, and
when the part of the surface of the occupant is in the detection target region, controlling the operation of the wind change is performed such that switching between the plurality of vent holes is not performed.

4. The vehicular air-conditioner according to claim 1, wherein
when the part of the surface of the occupant is in the detection target region, controlling the operation of the wind change is performed to suppress changes in a rotation speed of a blower that is provided to send out the air-conditioned wind.

5. The vehicular air-conditioner according to claim 1, wherein
the wind change switches between an outside air circulation mode in which air introduced from an outside of the vehicle is blown out as the air-conditioned wind and an inside air circulation mode in which air introduced from the vehicle interior is blown out as the air-conditioned wind, and when the part of the surface of the occupant is in the detection target region, controlling the operation of the wind change is performed such that switching between the outside air circulation mode and the inside air circulation mode is not performed.

6. A vehicular air-conditioner to be provided in a vehicle, the vehicular air-conditioner comprising:

the vehicular air-conditioner configured to:

change at least one of a wind volume and a wind direction of an air-conditioned wind to be blown out into a vehicle interior;

detect a surface temperature of an object based on radiation from the object;

change a position of a detection target region which is a region in which the surface temperature is to be detected; and control each of an operation of the wind change and an operation of the position detection, wherein the controlling of at least one of the operation of the wind change and the operation of the position detection suppresses the wind volume of the air-conditioned wind hitting an occupant in the detection target region when a part of a surface of the occupant is the detection target region, controlling the operation of the position detection is performed such that the detection target region does not overlap with an area of the surface of the occupant where the blown out air-conditioned wind reaches directly, the vehicle is provided with a first seat and a second seat adjacent to each other, the wind direction of the blown out air-conditioned wind alternates between a state in which the air-conditioned wind reaches the first seat and a state in which the air-conditioned wind reaches the second seat, controlling the operation of the position detection is performed such that the second seat is in the detection target region when the air-conditioned wind reaches the first seat, and the first seat is in the detection target region when the air-conditioned wind reaches the second seat, and when the air-conditioned wind reaches a position between the first seat and the second seat, controlling the operation of the position detection is performed such that a direction in which the position of the detection target region changes is opposite to a direction in which an arrival location of the air-conditioned wind changes.

7. A vehicular air-conditioner for a vehicle having a first seat and a second seat which are adjacent to each other, the vehicular air-conditioner comprising:

a rotatable louver configured to change a wind direction of an air-conditioned wind to be blown out into a vehicle interior of the vehicle;

a infrared (IR) sensor configured to detect a surface temperature of a target based on radiation from the target;

a motor coupled to the IR sensor configured to actuate the IR sensor to change a position of a detection target region of the IR sensor, the detection target region being a region in which the surface temperature is to be detected by the IR sensor; and a processor coupled to the louver, the IR sensor, and the motor, the processor being programmed to:

control the rotation of the louver to gradually change the wind direction of the air-conditioned wind to alternate between a state in which the air-conditioned wind reaches the first seat and a state in which the air-conditioned wind reaches the second seat, control the motor such that the second seat is in the detection target region when the air-conditioned wind reaches the first seat, and the first seat is in the detection target region when the air-conditioned wind reaches the second seat, and control the motor such that, when the air-conditioned wind reaches a position between the first seat and the second seat, a direction in which the position of the detection target region changes is opposite to a direction in which an arrival location of the air-conditioned wind changes.

* * * * *